US010986768B2

(12) United States Patent
Engel

(10) Patent No.: US 10,986,768 B2
(45) Date of Patent: *Apr. 27, 2021

(54) AGRICULTURAL PRODUCT APPLICATION IN OVERLAP AREAS

(71) Applicant: CNH Industrial Canada, Ltd., Saskatoon (CA)

(72) Inventor: Gordon Anthony Engel, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 16 days.

This patent is subject to a terminal disclaimer.

(21) Appl. No.: 16/227,385

(22) Filed: Dec. 20, 2018

(65) Prior Publication Data

US 2020/0196515 A1 Jun. 25, 2020

(51) Int. Cl.
*A01B 79/00* (2006.01)
*A01C 7/10* (2006.01)
(Continued)

(52) U.S. Cl.
CPC ............ *A01B 79/005* (2013.01); *A01C 7/102* (2013.01); *A01C 7/081* (2013.01); *G05D 1/0219* (2013.01);
(Continued)

(58) Field of Classification Search
CPC ..... A01L 379/005; A01C 7/102; A01C 7/081; G05D 1/0278; G05D 1/0219; G05D 2201/0201
See application file for complete search history.

(56) References Cited

U.S. PATENT DOCUMENTS 4,760,830 A * 8/1988 Bullis ................... F02D 35/022
123/501
4,995,216 A * 2/1991 Vansteelant ......... A01F 15/0715
53/118
(Continued)

FOREIGN PATENT DOCUMENTS

AU  782685 62     3/2003
WO  2008155235 A1  12/2008

OTHER PUBLICATIONS

Dickey-John Corporation; IntelliAG Control Systems for Precision Farming; 2013; pp. 1-16; available at: http://www.dickey-john.com/_media/IntelliAg%20Brochure_A4_11071-0423__RevB___Web.pdf.
(Continued)

*Primary Examiner* — Behrang Badii
*Assistant Examiner* — Jalal C Coduroglu
(74) *Attorney, Agent, or Firm* — Rebecca L. Henkel; Rickard K. DeMille

(57) ABSTRACT

A method, system and an apparatus minimize over-seeding and disruption of previously placed seed in an overlap area, when applying an agricultural product to a field with an agricultural product delivery arrangement having row units, by dispensing a predetermined first product amount equal to one hundred percent of a desired application to the field in a first pass through the entire field including the overlap area, and then dispensing a second product amount in a subsequent pass through the overlap area without raising row units out of the soil during the subsequent pass. The second product amount is determined as a function of a percentage the predetermined first product amount applied to the overlap area during the first pass that is disturbed by operative engagement of the row units with the soil during the subsequent pass over the overlap area.

20 Claims, 5 Drawing Sheets

(51) Int. Cl.
    *A01C 7/08*    (2006.01)
    *G05D 1/02*    (2020.01)
(52) U.S. Cl.
    CPC ... *G05D 1/0278* (2013.01); *G05D 2201/0201* (2013.01)

(56) References Cited

U.S. PATENT DOCUMENTS

| | | | | |
|---|---|---|---|---|
| 5,168,447 | A * | 12/1992 | Moore | F02C 9/28 701/99 |
| 5,433,059 | A * | 7/1995 | Kluver | A01F 15/0715 53/118 |
| 6,601,442 | B1 * | 8/2003 | Decker | F02D 41/2451 701/114 |
| 6,630,361 | B1 * | 10/2003 | Singh | H01L 22/20 257/E21.525 |
| 7,366,589 | B2 * | 4/2008 | Habermas | B60L 3/0023 701/1 |
| 7,774,130 | B2 * | 8/2010 | Pepper | F02D 41/1402 701/123 |
| 7,788,008 | B2 * | 8/2010 | Breed | G01G 23/3728 701/45 |
| 7,937,923 | B2 * | 5/2011 | Biziorek | A01F 15/0833 56/341 |
| 8,141,504 | B2 | 3/2012 | Dean et al. | |
| 8,587,367 | B1 * | 11/2013 | Pan | H02M 3/073 327/536 |
| 8,781,664 | B2 * | 7/2014 | Sujan | B60W 10/06 701/22 |
| 8,813,690 | B2 * | 8/2014 | Kumar | F02D 41/0025 123/1 A |
| 9,031,749 | B2 * | 5/2015 | Hubalek | A01C 7/102 701/50 |
| 9,251,891 | B1 * | 2/2016 | Hu | G11C 11/5642 |
| 9,591,799 | B2 * | 3/2017 | Henry | A01C 14/00 |
| 9,603,298 | B2 | 3/2017 | Wendte et al. | |
| 9,609,803 | B2 * | 4/2017 | Gervais | A01C 7/102 |
| 9,788,479 | B2 | 10/2017 | Kinch et al. | |
| 9,804,608 | B2 * | 10/2017 | Chahley | A01C 21/005 |
| 9,880,535 | B2 * | 1/2018 | Henry | A01B 79/005 |
| 9,913,424 | B2 * | 3/2018 | Henry | A01B 79/005 |
| 10,034,433 | B2 * | 7/2018 | Kraus | A01F 15/07 |
| 10,085,375 | B2 * | 10/2018 | Engel | A01C 21/005 |
| 2004/0125904 | A1 * | 7/2004 | Sofianos | H03C 3/0941 375/376 |
| 2007/0223278 | A1 * | 9/2007 | Aritome | G11C 16/10 365/185.11 |
| 2009/0241817 | A1 * | 10/2009 | Eastin | D01D 1/02 111/118 |
| 2012/0227647 | A1 | 9/2012 | Gelinske et al. | |
| 2012/0316736 | A1 * | 12/2012 | Hubalek | A01C 7/102 701/50 |
| 2013/0090988 | A1 * | 4/2013 | Moore | G06Q 30/0206 705/7.35 |
| 2013/0097182 | A1 * | 4/2013 | He | G06F 16/355 707/748 |
| 2014/0014188 | A1 * | 1/2014 | Szydlowski | F17D 1/08 137/2 |
| 2014/0244643 | A1 * | 8/2014 | Basak | G06F 16/217 707/737 |
| 2014/0304267 | A1 * | 10/2014 | Deng | G06F 16/285 707/737 |
| 2015/0115936 | A1 * | 4/2015 | Pratap | G01R 35/005 324/202 |
| 2015/0370556 | A1 * | 12/2015 | Strosaker | G06F 8/75 717/123 |
| 2016/0016525 | A1 * | 1/2016 | Chauncey | G07C 5/0808 701/123 |
| 2016/0052505 | A1 * | 2/2016 | Zhou | B60L 58/12 701/22 |
| 2016/0113191 | A1 | 4/2016 | Rosengren et al. | |
| 2016/0124009 | A1 * | 5/2016 | Wasson | B01L 3/0275 506/2 |
| 2016/0157420 | A1 * | 6/2016 | Gervais | A01C 7/102 700/231 |
| 2017/0057680 | A1 * | 3/2017 | Schlichting | A01F 15/0715 |
| 2017/0086355 | A1 | 3/2017 | Borkgren et al. | |
| 2017/0367253 | A1 | 12/2017 | Engel et al. | |
| 2018/0077856 | A1 | 3/2018 | Rice et al. | |
| 2019/0339687 | A1 * | 11/2019 | Cella | G05B 23/0264 |
| 2019/0339688 | A1 * | 11/2019 | Cella | G05B 19/41865 |

OTHER PUBLICATIONS

West Plains; Case iH-4 Agriculture; Precision Air Cart Pro 600/700 Quick Reference; CNH Industrial America LLC; pp. 1-2; available at: https://www.westplains.com/pdf/Precision%20Air%20Drill%20Quick%20Ref.pdf.

Case iH Agriculture; 2014 Precision Disk 500/500T Air Drills Productivity Tips; CNH industrial America LLC; 2014; pp. 1-32; available at: http://www.beredandready.com/pdfs/precision-disk-drill.pdf.

* cited by examiner

AGRICULTURAL PRODUCT APPLICATION IN OVERLAP AREAS

FIELD OF THE INVENTION

The present invention pertains to the application of agricultural products to an agricultural field and, more specifically, to a method and system for applying agricultural products to an agricultural field so as to maximize the efficiency of such application.

BACKGROUND OF THE INVENTION

Farmers typically use agricultural product delivery arrangements for seeding large agricultural fields. Such systems often include a tractor hitched in a conventional manner to an air cart and a "drill" (an agricultural implement typically including a number of row units). In operation, the tractor pulls the air cart and the drill through a field while the air cart pneumatically delivers agricultural product(s), such as seeds, fertilizer, and the like, to the drill. The drill, in turn, applies the agricultural product(s) to seed and/or fertilize the ground.

When seeding large fields, it is desirable to maximize use of the entire area of the field in order to ensure the most efficient use of space with the greatest crop yield possible. It is also desirable to minimize the overall travel path required by the product delivery arrangement in the field in order to ensure the most efficient use of the farmer's time and equipment. Also, minimizing the overall travel path helps to avoid undesirable disruption of already seeded ground.

However, many fields are shaped or disposed such that maximizing the entire area of the field requires at least some partially overlapping travel paths. For example, oddly shaped fields, or fields with obstacles, such as trees, structures, and the like, require additional maneuvering by the product delivery arrangement which may result in overlaps with earlier travel paths. Also, fields disposed on inclines may require travel paths at angles through the field, which may result in overlapping travel paths around the perimeter or "headlands" of the field. Such overlaps can cause double seeding, which results in heavier crops and potentially "lodging" (crops falling flat on the ground). Moreover, unnecessarily applying excess agricultural product can be costly.

In some prior approaches to precluding double seeding, application of the agricultural product is completely shut off during a subsequent pass in some row units of the drill as they pass through an overlap area. Application of the agricultural product through those row units is resumed as they emerge from the overlap area into an area that has not yet been planted. While this approach works reasonably well to preclude double seeding, it does not address the problem of the row units disrupting the previously planted seed in the overlap area during the subsequent pass through the overlap area.

In addition, there is typically an inherent time lag associated with completely stopping and re-starting a row unit, as a metering arrangement within the row unit that controls the application rate completely unloads and then re-loads itself with the agricultural product. This lag time can adversely affect the actual application rate.

Precise and accurate placement and/or other agricultural products in the soil is a critical factor in maximizing the crop yield. Having the row units disturb the previous placement of seed and/or agricultural product on subsequent passes through overlap areas is thus also undesirable.

Some prior approaches raise some of the row units out of contact with the soil during subsequent passes through overlap areas to avoiding double seeding and minimize disruption of previously planted soil in the overlap areas. This approach is not entirely satisfactory, however. To provide the capability for individually lifting sections of row units, and particularly for lifting each individual row unit free of the soil individually requires a level of complexity in the drill mechanism that undesirably drives up initial and maintenance cost of the drill, and it can lead to reduced reliability. Lifting sections of row units, or lifting individual row units, also typically results in some areas of the field going unplanted and/or untreated by agricultural chemicals and fertilizer applied by the row units.

What is needed is an improved technique for the application agricultural products which maximizes the entire area of a field while minimizing the drawbacks of overlapping with travel paths.

SUMMARY OF THE INVENTION

The invention provides a method and system for minimizing over-seeding and disruption of previously placed seed in an overlap area, when applying an agricultural product to a field with an agricultural product delivery arrangement having row units, by dispensing a predetermined first product amount equal to one hundred percent of a desired application to the field in a first pass through the entire field including the overlap area, and then dispensing a second product amount in a subsequent pass through the overlap area without raising row units out of the soil during the subsequent pass. The second product amount is determined as a function of a percentage the predetermined first product amount applied to the overlap area during the first pass that is disturbed by operative engagement of the row units with the soil during the second pass over the overlap area.

By keeping the row units in the soil on subsequent passes, and reducing the application rate of the agricultural product during subsequent passes to only an amount substantially equally to the percentage of previously applied product that is disrupted in the subsequent pass, efficiency and effectiveness of application of the product in overlap areas are improved, and overall efficiency of the application process is enhanced, without resorting to the undesirable complexities of some prior approaches. In addition, because the row unit continues to deliver the agricultural product in the overlap area, rather than completely stopping and restarting as in some prior approaches, problems with time lag in switching back-and-forth between the full desired application rate and the reduced percentage application rate are substantially reduced and/or eliminated.

In one form of the invention, a method is provided for applying an agricultural product to an agricultural field with an agricultural product delivery arrangement, where the agricultural product delivery arrangement includes a product dispensing unit and a control system for controlling a rate of product flow through the product dispensing unit.

The method may include the steps of: determining a first portion of the agricultural field wherein agricultural product will be delivered at least twice to the agricultural field and designating the first portion of the agricultural field as an overlap area; determining a second portion of the agricultural field outside of the overlap area; dispensing a predetermined first product amount on both the overlap area and the second portion of the field in a first pass of the product dispensing unit over the field; and, dispensing a second product amount on the overlap area of the agricultural field in a subsequent pass of the product dispensing unit over the field, with the second product amount being less than the predetermined first product amount dispensed on the overlap area and second portion of the field in the first pass of the product dispensing unit over the field.

Where the product dispensing unit includes a row unit that is adapted for operatively engaging the soil of the field and for dispensing the first and second dispensed product amounts into the soil of the field, a method, according to the invention, may further include making the first and subsequent pass with the row unit fully operatively engaging the soil of the field.

Some forms of the invention include determining a percentage of the predetermined first product amount applied to the overlap area during the first pass that is disturbed by operative engagement of the row unit with the soil during the second pass over the overlap area, and then determining the second product amount as a function of the disturbed percentage of the predetermined first product amount applied to the overlap area in the first pass over the overlap area.

Some forms of the invention may also include receiving location data to determine the overlap area. The location data may be received from a Global Positioning System.

The overlap area may be determined based on a dimension of the product dispensing unit, in some forms of the invention. The first and second product amounts may be determined in response to a travel speed of the agricultural product delivery arrangement across the agricultural field. The location of an overlap area may be determined by traveling a perimeter of the agricultural field. In some forms of the invention, the location of the overlap area may be at least partially determined by traveling a perimeter of the agricultural field with the agricultural product delivery arrangement.

The invention may also take the form of an agricultural product delivery arrangement having a plurality of product dispensing row units for applying an agricultural product to the ground, and a control system for controlling a rate of product flow through the product dispensing row units. The control system may be configured for controlling application rates of the product in an initial and a subsequent pass of the row units over the field, in accordance with the invention.

A control system of such an agricultural product delivery arrangement, according to the invention, may be configured for: determining a first portion of the agricultural field wherein agricultural product will be delivered at least twice to the agricultural field and designating the first portion of the agricultural field as an overlap area; determining a second portion of the agricultural field outside of the overlap area; dispensing a predetermined first product amount on both the overlap area and the second portion of the field in a first pass of the product dispensing row units over the field; and, a second product amount on the overlap area of the agricultural field in a subsequent pass of the product dispensing row units over the field, with the second product amount being less than the predetermined first product amount dispensed on the overlap area and second portion of the field in the first pass of the product dispensing row units over the field.

In some forms of and agricultural product delivery arrangement, according to the invention, the product dispensing row units may be adapted for operatively engaging the soil of the field and for dispensing the first and second dispensed product amounts into the soil of the field, and the agricultural product delivery arrangement may be adapted for making the first and subsequent pass with the row units fully operatively engaging the soil of the field.

A control system in an agricultural product delivery arrangement that is adapted for making the first and subsequent pass with the row units fully operatively engaging the soil of the field, in accordance with the invention, may be further configured for: determining a percentage of the predetermined first product amount applied to the overlap area during the first pass that is disturbed by operative engagement of the row unit with the soil during the second pass over the overlap area; and, determining the second product amount as a function of the disturbed percentage of the predetermined first product amount applied to the overlap area in the first pass over the overlap area.

A control system in an agricultural product delivery arrangement, according to the invention, may be configured to individually control the rate of product flow through each of the product dispensing units.

Some forms of an agricultural product delivery arrangement, according to the invention, may include a wireless transceiver operatively connected to the control system, the wireless transceiver transmitting location data to the control system, such that the control system determines the overlap area in response to the location data. The wireless transceiver may be part of a Global Positioning System.

Some forms of the invention may also include a speed sensor operatively connected to the control system and configured to determine a ground speed of the product delivery arrangement. The control system may be adapted for receiving a signal corresponding to the ground speed from the speed sensor and determining the first and second product amounts in response to the signal.

In some forms of the invention, the first product amount is approximately 100% of the desired product amount, and the second product amount is approximately less than 100% of the desired product amount.

The invention may also take the form of a control system for an agricultural product delivery arrangement adapted for delivering an agricultural product to a field and having a product dispensing row unit. Such a control system may include a controller operatively connected for controlling a rate of product flow through the product dispensing row unit, in accordance with the invention. The controller may be configured for: determining a first portion of the agricultural field wherein agricultural product will be delivered at least twice to the agricultural field and designating the first portion of the agricultural field as an overlap area; determining a second portion of the agricultural field outside of the overlap area; dispensing a predetermined first product amount on both the overlap area and the second portion of the field in a first pass of the product dispensing unit over the field; and then dispensing a second product amount on the overlap area of the agricultural field in a subsequent pass of the product dispensing unit over the field, with the second product amount being less than the predetermined first product amount dispensed on the overlap area and second portion of the field in the first pass of the product dispensing unit over the field.

A control system, according to the invention, may further include an input/output unit operatively attached to the controller and configured for supplying a parameter input to the controller for determining the second product amount as a function of a disturbed percentage of the predetermined first product amount applied to the overlap area in the first pass over the overlap area.

Other aspects, objects, features, and advantages of the invention will be apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
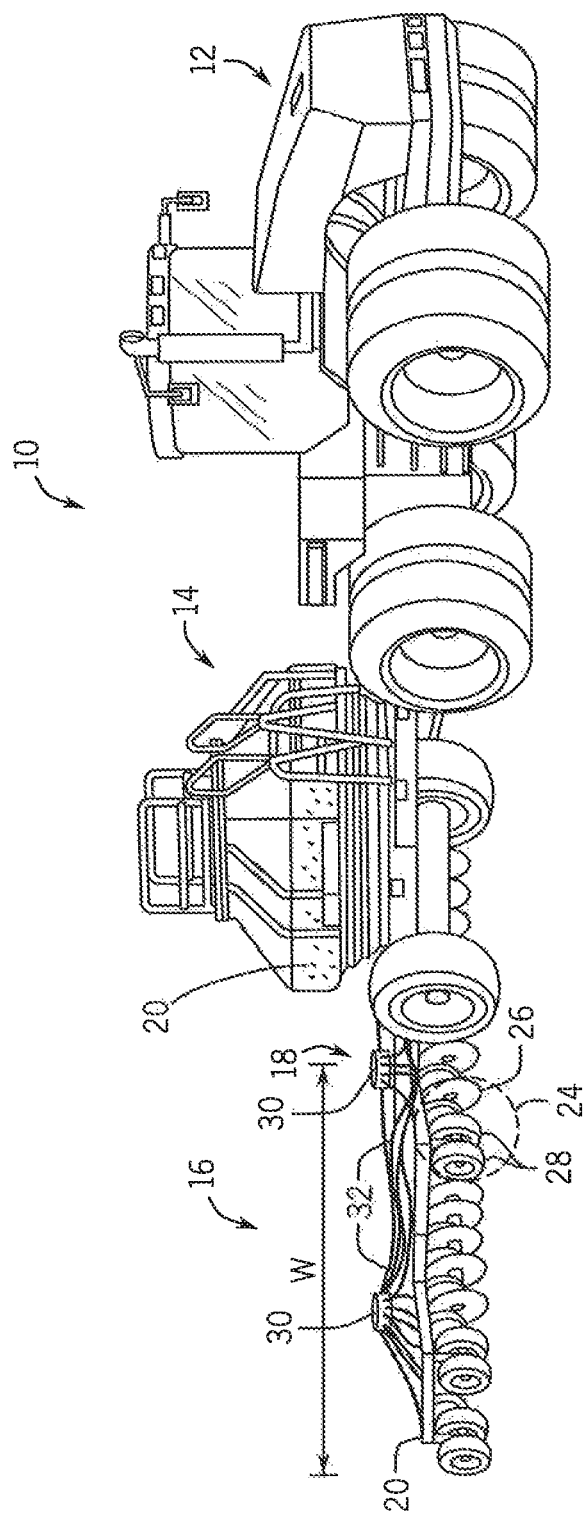
FIG. 1 illustrates an isometric view of an exemplary embodiment of an agricultural product delivery arrangement having a plurality of product dispensing units for applying an agricultural product to an agricultural field, in accordance with an exemplary embodiment of the present invention.

Referring now to FIG. 1, an isometric view of an exemplary embodiment of agricultural product delivery arrangement 10 is shown in accordance with the present invention. The product delivery arrangement 10 may be used for seeding a large agricultural field and may typically include a tractor 12 hitched in a conventional manner to an air cart 14 and a drill 16 having a width "W." The air cart 14 could be, for example, a PRECISION AIR® cart, and the drill 16 could be, for example, an ATX700 air hoe drill, each available from the Case IH company.

A pneumatic distribution system 18 may be arranged with respect to the air cart 14 and the drill 16 for pneumatically delivering an agricultural product 20, such as seeds, fertilizer, and the like, from the air cart 14 to the drill 16 for distribution to the field. The pneumatic distribution system 18 includes a fan(s), which may be a centrifugal fan, for generating an airflow(s) that is directed through the pneumatic distribution system 18 to entrain the product 20 for pneumatic delivery to the field.

The drill 16 includes a frame 22 to which a plurality of row units 24 are coupled. Each row unit 24 may include an opener 26, such as the disc-style opener as illustrated, and row finishing equipment, such as the packer or closing wheels 28 as illustrated. The opener 26 is configured to cut a furrow into the soil. One or more distribution manifolds 30 are arranged on the drill 16 and are respectively connected to distribution lines 32. The distribution manifolds 30 distribute the product 20 to individual dispensing units (shown in FIG. 2A) for each row unit 24 to dispense the product 20 into furrows created in the field. This allows the pneumatic distribution system 18 to pneumatically deliver the product 20 from the air cart 14 into a furrow cut by the opener 26. The closing wheels 28 are arranged on the drill 16 for subsequently closing the furrow.

Figure 2A:
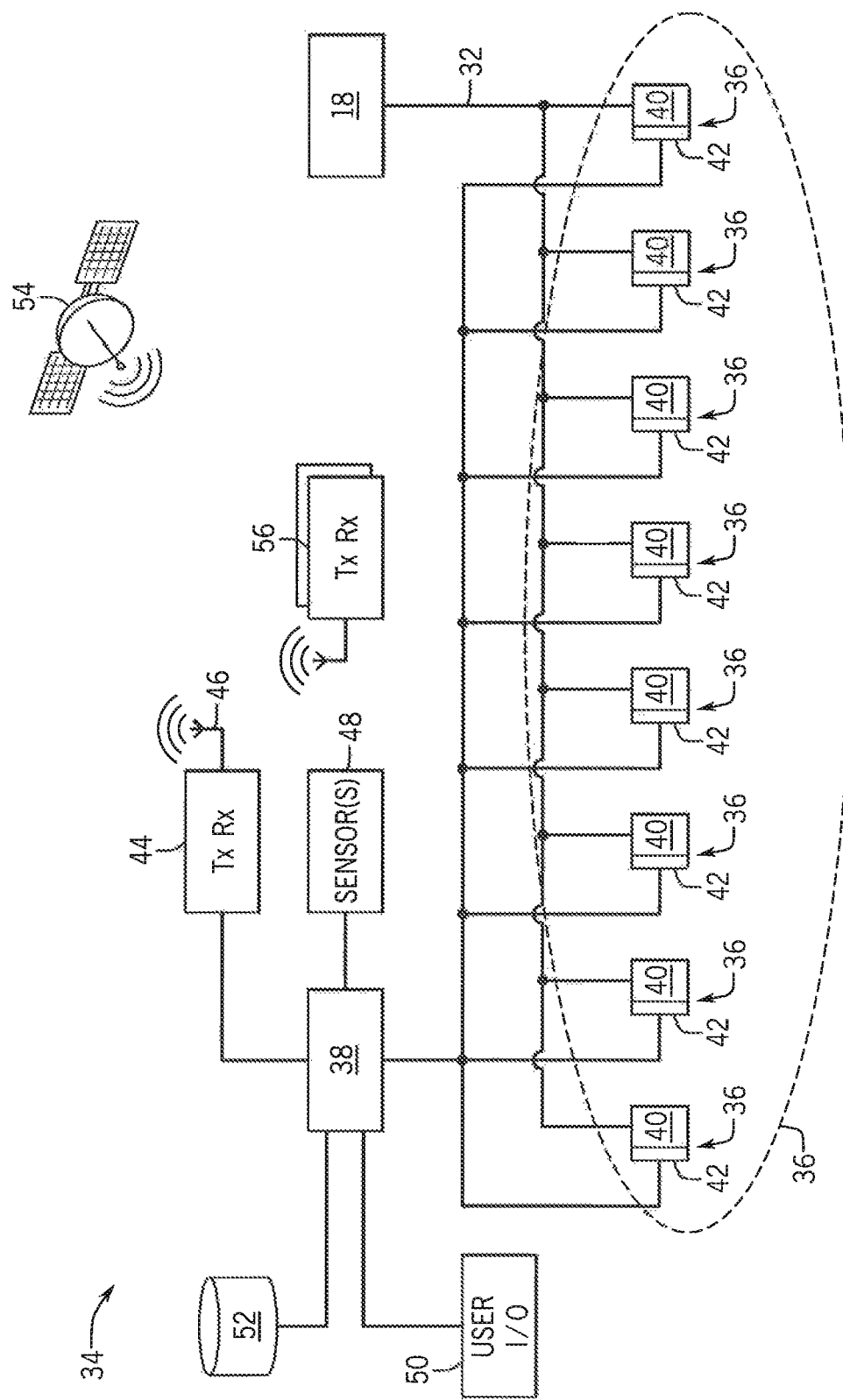
FIG. 2A illustrates a schematic view of a control system in a first aspect.

Referring now to FIG. 2A, a schematic view of a control system 34 in a first aspect for effectuating the methodology of the present invention is provided. The exemplary embodiment of the product delivery arrangement 10, as illustrated in the control system 34, includes a metering/dispensing system 35 for receiving the product 20 from the air cart 14 and delivering the product 20 to the drill 16 for distribution to the ground.

The metering/dispensing system 35 includes multiple dispensing units 36, which include a metering unit 40 that receives a portion of the product 20 from the air cart 14 via the pneumatic distribution system 18, and a prime mover 42 which drives the metering unit 40. A controller 38, e.g., a microprocessor, a microcontroller, or other programmable logic device, is operatively connected to and individually controls the dispensing units 36 via the prime movers 42 such that distribution rates of the individual metering units 40 can be varied independently of each other. The prime movers 42 may be, for example, electric motors. Other techniques for providing individually driven or controlled dispensing units 36, such as electronically controlled valves and the like, may be provided within the spirit of the invention. Accordingly, each of the dispensing units 36 is controlled by the controller 38 to dispense the product 20 by a variable rate or amount ranging anywhere from zero (completely off) to 100% (completely on). For example, a particular dispensing unit 36 could be controlled to first dispense the product 20 at a rate of 100%, then, at a different time, a rate of less than 100%.

The controller 38, in turn, is connected to a transceiver 44 and antenna 46, one or more sensors 48, a user input/output (I/O) interface 50 and a storage device 52. The transceiver 44 is configured to allow wireless communication, via the antenna 46, between the controller 38 and another device. The transceiver 44 may receive real-time location data as part of Global Positioning System (GPS) via GPS satellites 54. The transceiver 44 may also receive real-time location data and/or other communications from a field communication system 56. The one or more sensors 48 may provide sensed information to the controller 38, including, but not limited to, a speed of the product delivery arrangement 10.

The user I/O interface 50 provides a mechanism for displaying real-time information from the controller 38 to an operator in the cab of the tractor 12, and for receiving real-time information from the operator in the cab to the controller 38. The user I/O interface 50 may display, for example, the dispensing status of each of the dispensing units 36 and/or location data from the transceiver 44 and antenna 46, and may receive, for example, information regarding the agriculture product(s) being dispensed, the configuration of the air cart 14 and the drill 16 (including the number of dispensing units 36, the throughput of each of the dispensing units 36, the width of the product delivery arrangement, and/or the real-dine speed of the product delivery arrangement 10).

The controller 38 may store data received from the transceiver 44, the sensors 48, the user I/O interface 50; pre-programmed data; and/or an updateable control program for controlling the dispensing units 36 in an internal memory structure and/or the storage device 52. The internal memory structure and/or the storage device 52 may be a non-volatile memory array such as Flash memory.

Figure 2B:
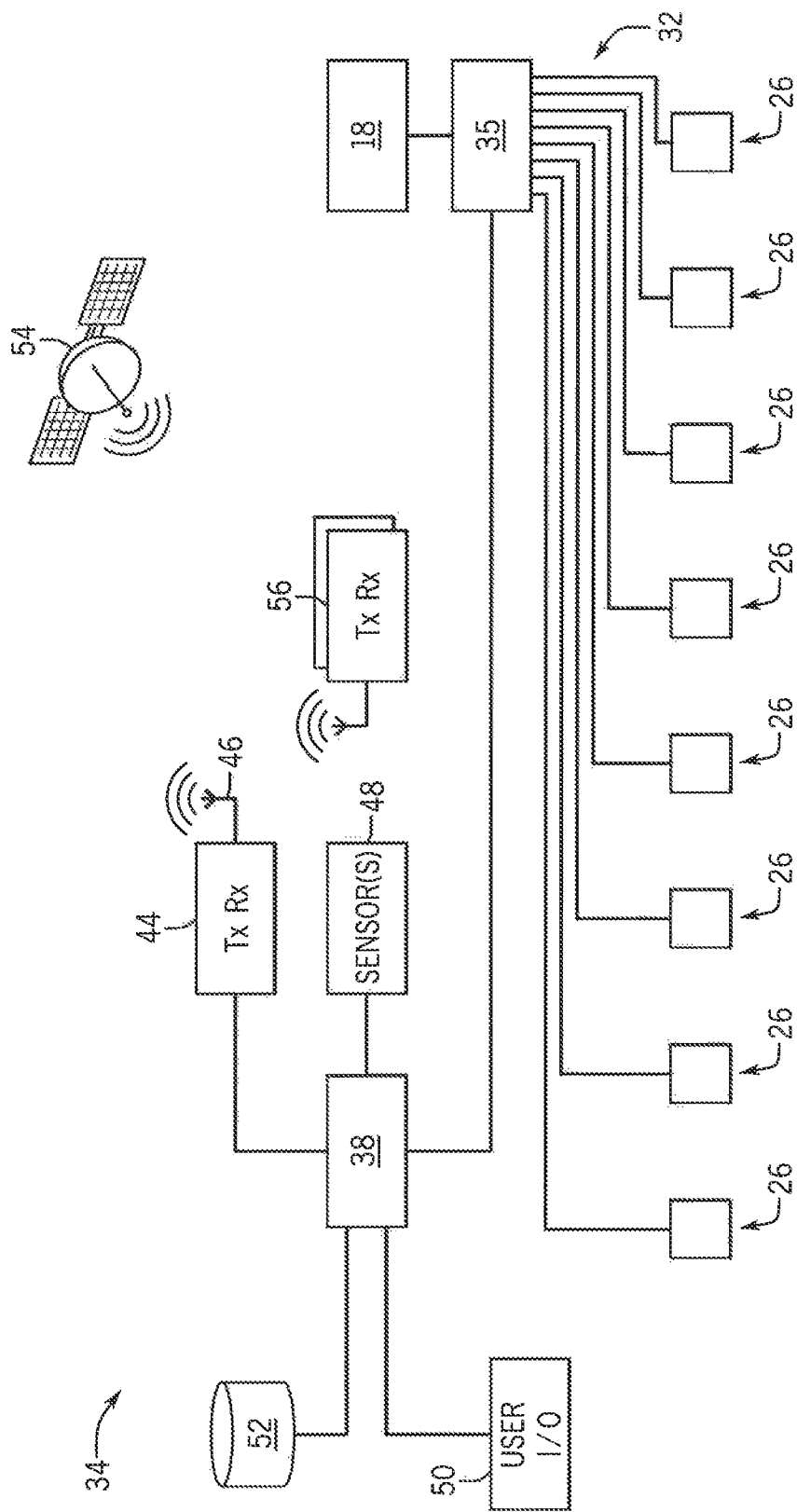
FIG. 2B illustrates a schematic view of a control system in a second aspect, each in accordance with an exemplary product delivery arrangement of FIG. 1.

Referring now to FIG. 2B, a schematic view of a control system 34 in a second aspect for effectuating the methodology of the present invention in which like reference numerals are employed to designate corresponding parts. Here, the metering/dispensing system 35 may be disposed on the air cart 14, in proximity to the pneumatic distribution system 18. The metering/dispensing system 35 is in communication with the controller 38 to dispense the product 20 at different rates that are particular to the individual distribution lines 32. The individual distribution lines 32, in turn, lead to the opener 26 for placement in the ground. Accordingly, the metering/dispensing system 35 may be controlled by the controller 38 to dispense the product 20 by a variable rate or amount ranging anywhere from zero (completely off) to 100% (completely on) for each row unit.

Figure 3:
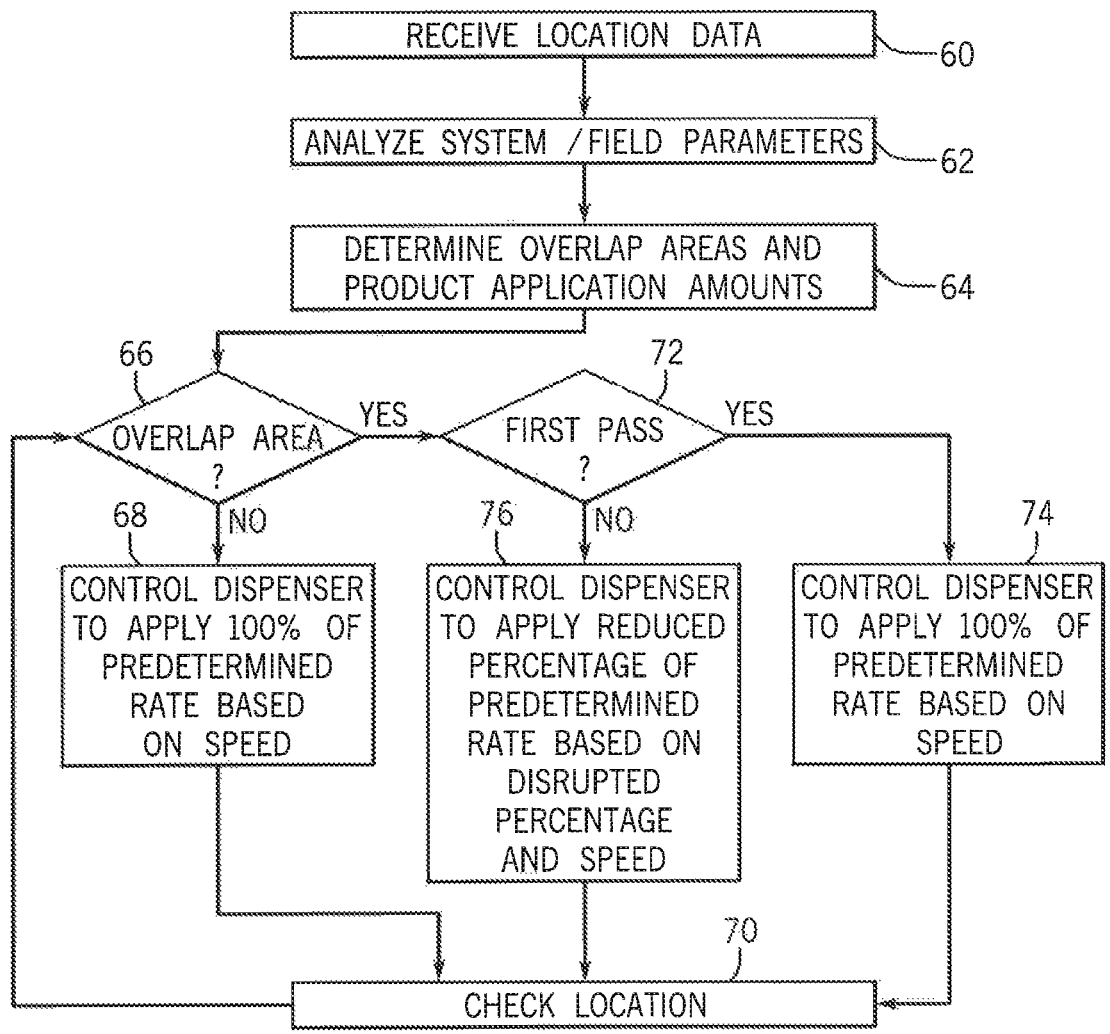
FIG. 3 illustrates a flow chart dispensing an agricultural product to the ground using the control system of FIG. 2, in accordance with an exemplary embodiment of the present invention.

Referring now to FIG. 3, a flow chart illustrating dispensing an agricultural product to the ground using the control system of FIG. 2 is provided. Initially, in process block 60, the controller 38 receives location data, such as precise GPS coordinate data via the transceiver 44 and antenna 46. Next, in process block 62, the controller 38 analyzes system and field parameters. System parameters may include, for example, the number of dispensing units 36, the throughput of each of the dispensing units 36, the width "W" of the product delivery arrangement, which reflects a physical dimension (such as 17 feet) of the distance across the drill 16 for covering an area of ground as the drill 16 moves forward, a desired speed, a desired angle of travel, and the like, which may be pre-programmed and/or provided by the user I/O 50. Field parameters may include a mapping of the field, which may be pre-programmed and/or determined by initially travelling along the boundaries of the field, such as around the perimeter, while receiving location data.

Next, in process block 64, based on the system and field parameters, the controller 38 automatically calculates and determines areas in the field, with coordinate locations, in which seeding overlap is expected to occur. In doing so, the controller 38 may base such predicted overlaps on an idealized or preferred travel path which minimizes the overall travel path required and which is provided to the operator in the cab. The operator may optionally adjust the travel path via the user I/O 50, and accordingly, the controller 38 may adjust the predicted overlap areas.

When determining the product application rates in block 64, a predetermined desired product application rate for the entire field 80 is determined. The preferred amount of seeding could be determined, for example by the user on a bulk mass basis (e.g., lbs. per acre) or on a seed population basis (e.g., seeds per acre).

A determination is also made for the percentage of previously planted seed that will be disturbed during a subsequent pass over the overlap areas with the row units 24 fully engaging the soil. This determination may be made automatically by the controller 38 in accordance with parameters stored in the storage device 52, which can then be modified, or alternatively supplied as an input through the user I/O 50 by an operator of the product application system 10.

Next, while seeding the field, in decision block 66, the controller determines whether any part of drill 16 is entering or in an overlap area. If the drill 16 is not in an overlap area, the process continues to process block 68 in which the controller 38 controls the rate of product flow through the dispensing units 36 to apply 100 percent of the predetermined (or target) product amount for the area. The process then continues to process block 70 in which the location is checked. Then, the process returns to decision block 66 to again determine whether any part of the drill 16 is entering into, or remains in, an overlap area.

If the drill 16 is entering into or still remains in an overlap area, the process then continues to decision block 72. In decision block 72, it is determined if this is the first pass in that particular overlap area. If it is the first pass, then the process continues to process block 74 in which at least one of the dispensing units 36 is controlled to dispense 100 percent of the predetermined (or target) product amount in the overlap area. In other words, during the first pass over each overlap area the controller 38 maintains the product application rate of corresponding drill sections in the overlap area at 100 percent of the desired amount. Each of the dispensing units 36 may be controlled individually based on its location status with respect to the overlap area.

The process then continues to process block 70 in which the location is checked. Then, then the process returns to decision block 66 to again determine whether any part of the drill 16 is entering or in an overlap area.

However, if it is determined in decision block 72 that this is not the first pass in the particular overlap area, but rather a subsequent pass at a different time, then the process continues to process block 76. In process block 76, at least one of the dispensing units 36 is controlled to dispense a second product amount in the overlap area at a reduced rate to compensate for any disruption of the seed planted on the first pass through the overlap area by engagement of the dispensing row units 36 with the soil in the overlap area on the subsequent pass of the dispensing row units 36 through the overlap area.

Simply stated, the controller 38 causes the row units to effectively re-plant only the seed that is disrupted during the second pass through the overlap areas. In this manner, double seeding in the overlap areas is precluded, and planting efficiency and effectiveness is improved by obviating the practice of lifting the dispensing units 36 free of the soil, as was required in some prior product application methods, systems and apparatuses.

The controller 38 reduces the seed planted in the second pass as a function of the percentage of seed planted in a previous pass that is disturbed by the dispensing units 36 during the subsequent pass through the overlap area. The percent of seed or soil disrupted or disturbed in the subsequent pass will be highly dependent upon the shape and location of the overlap area with respect to the remained of the field. Disruptions during tight turns of the drill 16 while maneuvering through the field will likely cause more disruption than wide gentle turns, for example.

During the subsequent pass through the overlap area, each of the dispensing units 36 may be controlled individually based on its location status with respect to the overlap area. The process then continues to process block 70 in which the location is checked, then to decision block 66 in which it is again determined whether any part of the drill 16 is entering into or remains in an overlap area.

The dispensing units 36 may also be controlled to dispense product 20 in accordance with travel speed of the system 10 and, in turn, the drill 16, to allow time for the dispensing units 36 to change application rates as they enter and leave the overlap areas. As such, the metering/dispensing system 35 may adjust ahead of time (e.g., slow down or speed up) to account for lag time for the actual rate of product 20 to travel from the air cart 14 (or other product tank) to the openers 26 for placement in the ground. This lag time may vary with the travel speed and metering/dispensing rate. For example, the metering/dispensing system 35 may have to start adjusting about four seconds ahead of reaching the overlap area 84. This timing may be determined based on the travel speed, the position of the drill 16 (such as via GPS) and the distance to the mapped/projected overlap area 84.

Those having skill in the art will readily recognize and appreciate that, because the row units 36 continue to deliver the agricultural product at a reduced percentage rate while in the overlap area 84 on a subsequent pass rather than completely stopping and restarting as in some prior approaches, the time lags inherent in switching back-and-forth between the full desired application rate and the reduced percentage application rate are substantially reduced, and/or eliminated through practice of the invention, thus resulting in a more uniform application rate in the overlap areas 84.

Figure 4:
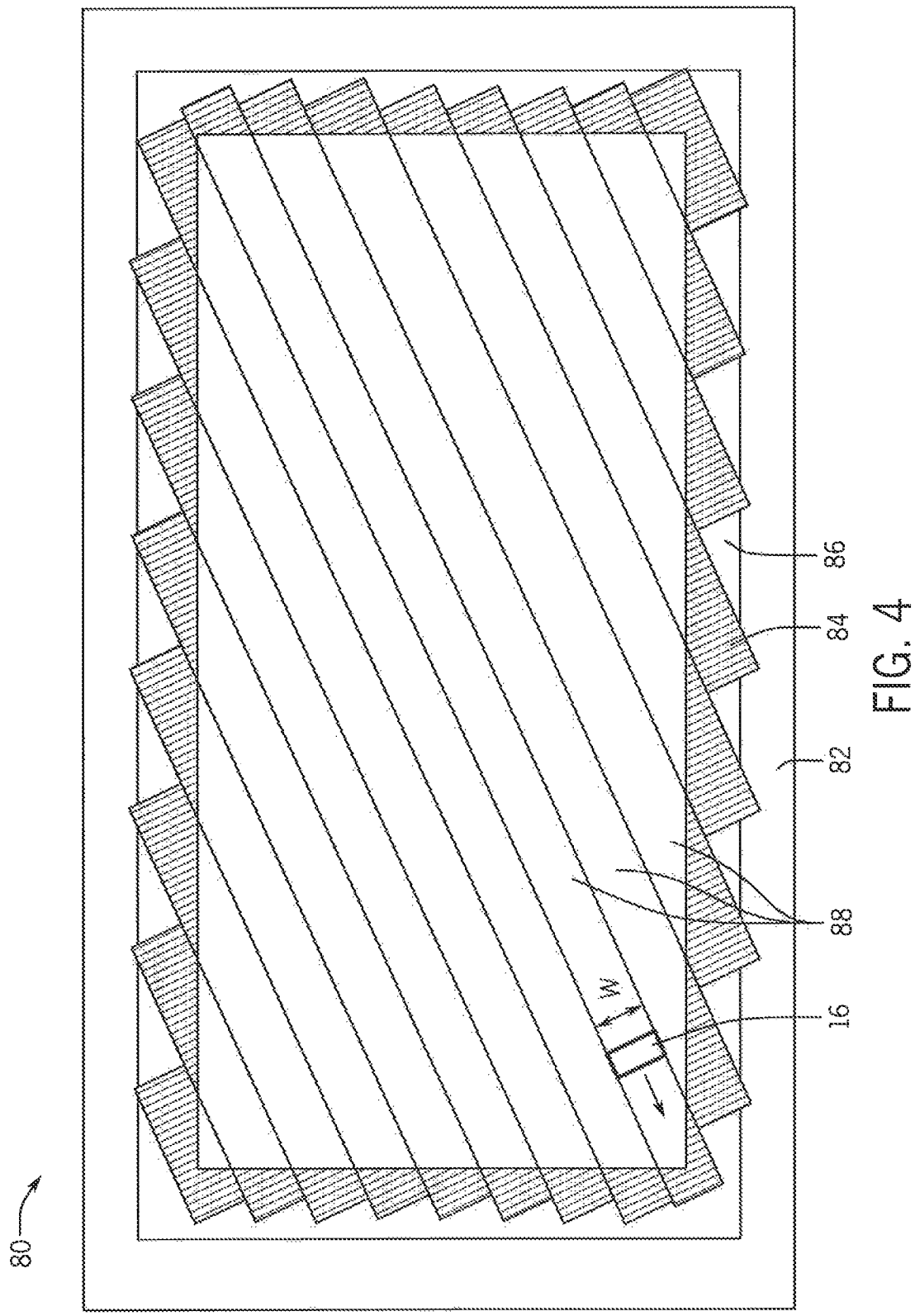
FIG. 4 illustrates a diagram of an agricultural field including predetermined overlap areas, in accordance with an exemplary embodiment of the present invention.

Referring now to FIG. 4, a diagram of an exemplary agricultural field 80 including predetermined overlap areas is provided. The agricultural field 80 may be disposed on an incline such that travel paths at angles through the field would be desirable. Accordingly, certain overlap areas 84 may be expected around the perimeter or "headlands" of the field 80 due to the travel paths at angles reaching the perimeter of the field 80.

The drill 16 is drawn by the tractor 12 and the air cart 14 (the product delivery arrangement 10) around the perimeter of the field 80 to complete a first seeding travel path 82. During the first seeding travel path 82, the product delivery arrangement 10 may gather data and perform calculations as described above with respect to FIGS. 2-3. In particular, the controller 38 identifies the overlap areas 84 based on parameters of the drill 16, such as its width "W" as illustrated. Next, the product delivery arrangement 10 may complete a second seeding travel path 86 around the perimeter of the field 80 for a first pass through the overlap areas 84. During the second seeding travel path 86, the product delivery arrangement 10, and in turn, the drill 16, enters and exits the overlap areas 84. As dispensing units 36 of the product delivery arrangement 10 enter each overlap area 84 (first pass), the rates of product flow through particular product dispensing units 36 are maintained at 100 percent of the desired predetermined product application rate in the overlap area 84.

Upon completing the second seeding travel path 86, a plurality of third seeding travel paths 88 are completed at desired angles through the field 80. Accordingly, in the interior of the field 80, during third seeding travel paths 88, the dispensing units 36 of the product delivery arrangement 10 deliver 100% of the predetermined product application amount as desired for a single pass. However, as the product delivery arrangement 10 encounters an overlap area 84 from the second seeding travel path 86, such as to make a turn for the next of the third seeding travel paths 88, the rate of product flow through particular product dispensing units 36 is reduced to essentially re-apply a percentage of the previously applied agricultural product that is disturbed during the subsequent pass through each overlap area 84.

For example, in the overlap area 84, the dispensing units 36 may deliver only 25% of the predetermined product application amount in the second pass, if it is determined that 25% of the originally delivered product will be disturbed on the subsequent pass.

Then, as dispensing units 36 of the product delivery arrangement 10 exit the overlap area 84 and begin another of the third seeding travel paths 88, the dispensing units 36 resume delivering 100% of the predetermined product application amount as desired for a single pass.

As previously stated, those having skill in the art will readily recognize that by having the row units 36 continue to deliver the agricultural product at a reduced percentage rate while in the overlap area 84 on a subsequent pass, rather than completely stopping and restarting as in some prior approaches, problems with time lag in switching back-and-forth between the full desired application rate and the reduced percentage application rate are substantially reduced and/or eliminated through practice of the invention, thus resulting in a more uniform application rate in the overlap areas 84.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:

1. A method of applying an agricultural product to an agricultural field with an agricultural product delivery arrangement, the agricultural product delivery arrangement having a product dispensing unit and a control system for controlling a rate of product flow through the product dispensing unit, the method comprising:
   determining a first portion of the agricultural field wherein agricultural product will be delivered at least twice to the agricultural field and designating the first portion of the agricultural field as an overlap area;
   determining a second portion of the agricultural field outside of the overlap area;
   dispensing a predetermined first product amount on both the overlap area and the second portion of the field in a first pass of the product dispensing unit over the field; and
   dispensing a second product amount on the overlap area of the agricultural field in a subsequent pass of the product dispensing unit over the field, the second product amount being less than the predetermined first product amount dispensed on the overlap area and second portion of the field in the first pass of the product dispensing unit over the field.

2. The method of claim 1, wherein the product dispensing unit includes a row unit that is adapted for operatively engaging the soil of the field and for dispensing the first and second dispensed product amounts into the soil of the field, and the method further includes making the first and subsequent pass with the row unit fully operatively engaging the soil of the field.

3. The method of claim 2, further comprising:
   determining a disturbed percentage of the predetermined first product amount applied to the overlap area during the first pass that is disturbed by operative engagement of the row unit with the soil during the second pass over the overlap area; and
   determining the second product amount as a function of the disturbed percentage of the predetermined first product amount applied to the overlap area in the first pass over the overlap area.

4. The method of claim 1, further comprising receiving location data to determine the overlap area.

5. The method of claim 4, wherein the location data is received from a Global Positioning System.

6. The method of claim 5, comprising determining the overlap area based on a dimension of the product dispensing unit.

7. The method of claim 6, further comprising determining the first and second product amounts in response to a travel speed of the agricultural product delivery arrangement across the agricultural field.

8. The method of claim 1, further comprising determining a location of the overlap area by traveling a perimeter of the agricultural field.

9. The method of claim 8, wherein the location of the overlap area is at least partially determined by traveling a perimeter of the agricultural field with the agricultural product delivery arrangement.

10. An agricultural product delivery arrangement comprising:
a plurality of product dispensing row units for applying an agricultural product to the ground; and
a control system for controlling a rate of product flow through the product dispensing row units;
the control system being configured for determining a first portion of the agricultural field wherein agricultural product will be delivered at least twice to the agricultural field and designating the first portion of the agricultural field as an overlap area;
the control system also being configured for determining a second portion of the agricultural field outside of the overlap area;
the control system being further configured for dispensing a predetermined first product amount on both the overlap area and the second portion of the field in a first pass of the product dispensing row units over the field;
the control system being yet further configured for dispensing a second product amount on the overlap area of the agricultural field in a subsequent pass of the product dispensing row units over the field, the second product amount being less than the predetermined first product amount dispensed on the overlap area and second portion of the field in the first pass of the product dispensing row units over the field.

11. The system of claim 10, wherein the product dispensing row units are adapted for operatively engaging the soil of the field and for dispensing the first and second dispensed product amounts into the soil of the field, and the agricultural product delivery arrangement is adapted for making the first and subsequent pass with the row units fully operatively engaging the soil of the field.

12. The agricultural product delivery arrangement of claim 11, wherein the control system is further configured for:
determining a percentage of the predetermined first product amount applied to the overlap area during the first pass that is disturbed by operative engagement of the row unit with the soil during the second pass over the overlap area; and
determining the second product amount as a function of the disturbed percentage of the predetermined first product amount applied to the overlap area in the first pass over the overlap area.

13. The agricultural product delivery arrangement of claim 10, wherein the control system is configured to individually control the rate of product flow through each of the product dispensing units.

14. The agricultural product delivery arrangement of claim 10, further comprising a wireless transceiver operatively connected to the control system, the wireless transceiver transmitting location data to the control system, such that the control system determines the overlap area in response to the location data.

15. The agricultural product delivery arrangement of claim 14, wherein the wireless transceiver is part of a Global Positioning System.

16. The agricultural product delivery arrangement of claim 15, wherein the control system is configured to determine a location of the overlap area in response to a dimension of the product dispensing units.

17. The agricultural product delivery arrangement of claim 16, further comprising a speed sensor operatively connected to the control system and being configured to determine a ground speed of the product delivery arrangement, the control system adapted for receiving a signal corresponding to the ground speed from the speed sensor and determining the first and second product amounts in response to the signal.

18. The agricultural product delivery arrangement of claim 10, wherein the first product amount is approximately 100% of the desired product amount, and the second product amount is approximately less than 100% of the desired product amount.

19. A control system for an agricultural product delivery arrangement adapted for delivering an agricultural product to a field and having a product dispensing row unit, the control system comprising:
a controller operatively connected for controlling a rate of product flow through the product dispensing row unit;
the controller being configured for determining a first portion of the agricultural field wherein agricultural product will be delivered at least twice to the agricultural field and designating the first portion of the agricultural field as an overlap area;
the controller also being configured for determining a second portion of the agricultural field outside of the overlap area;
the controller being further configured for dispensing a predetermined first product amount on both the overlap area and the second portion of the field in a first pass of the product dispensing unit over the field; and
the controller being yet further configured for dispensing a second product amount on the overlap area of the agricultural field in a subsequent pass of the product dispensing unit over the field, the second product amount being less than the predetermined first product amount dispensed on the overlap area and second portion of the field in the first pass of the product dispensing unit over the field.

20. The control system of claim 19, further including an input/output operatively attached to the controller and configured for supplying a parameter input to the controller for determining the second product amount as a function of a disturbed percentage of the predetermined first product amount applied to the overlap area in the first pass over the overlap area.

* * * * *